United States Patent
Christopherson et al.

(10) Patent No.: US 11,606,772 B2
(45) Date of Patent: Mar. 14, 2023

(54) SYSTEMS AND METHODS FOR UNMANNED AERIAL VEHICLE DETECTION

(71) Applicant: Verizon Patent and Licensing Inc., Basking Ridge, NJ (US)

(72) Inventors: Corey J. Christopherson, Bainbridge Island, WA (US); David George Lincoln, Jr., Leesburg, VA (US); Donna L. Polehn, Mercer Island, WA (US); Paul James Purcell, Lake Forest, CA (US); Fred Weisbrod, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 72 days.

(21) Appl. No.: 17/220,163

(22) Filed: Apr. 1, 2021

(65) Prior Publication Data
US 2022/0322278 A1    Oct. 6, 2022

(51) Int. Cl.
*H04W 64/00*     (2009.01)
*G06K 9/00*      (2022.01)
*G01S 5/02*      (2010.01)

(52) U.S. Cl.
CPC ....... *H04W 64/006* (2013.01); *G01S 5/02521* (2020.05); *G06K 9/00536* (2013.01)

(58) Field of Classification Search
CPC ....... H04W 4/38; H04W 52/16; H04W 12/64; H04W 24/02; H04W 24/10
See application file for complete search history.

(56) References Cited

U.S. PATENT DOCUMENTS

2018/0129884 A1* 5/2018 Seeber ............... G06T 7/223
2021/0120521 A1* 4/2021 Bin Redhwan .... H04B 7/18506

* cited by examiner

*Primary Examiner* — Kwasi Karikari

(57) ABSTRACT

A method may include obtaining connection-related data associated with user equipment (UE) devices operating in a network, wherein the UE devices include unmanned aerial vehicles (UAVs) and devices other than UAVs. The method may include storing the connection-related data; identifying, in the stored connection-related data, data associated with known UAVs and filtering the stored connection-related data based on a distance associated with a known UAV. The method may further include training a machine learning classifier using the filtered data and executing the machine learning classifier to identity UAVs operating in the network.

20 Claims, 7 Drawing Sheets

SYSTEMS AND METHODS FOR UNMANNED AERIAL VEHICLE DETECTION

BACKGROUND INFORMATION

The use of Unmanned Aerial Vehicles (UAVs), also referred to as drones, is dramatically increasing. For example, UAVs are more frequently being used for both recreational and business purposes, such as obtaining aerial images, delivering packages, etc. In some instances, the UAVs may communicate with a network to send/receive information to/from other devices and systems, such as image data from a camera included on the UAV, command data for controlling the UAV and telemetry data associated with the UAV's flight. As a result, providing reliable data services to UAVs while in flight is becoming increasingly important. UAVs, however, may have different user profiles than other types of user equipment (UE) devices operating on a service provider's network.

DETAILED DESCRIPTION OF PREFERRED EMBODIMENTS

The following detailed description refers to the accompanying drawings. The same reference numbers in different drawings may identify the same or similar elements.

Service providers, including wireless service providers, may wish to have knowledge of the types of devices connected to their network. For example, knowing the types of UE devices connected to the network at any particular time, as well as usage profiles for the UE devices, may allow a wireless service provider to provide improved network management and resource provisioning and more reliable network services. For example, knowing the types of UE devices operating on a network may provide the wireless service provider with information to enable the wireless service provider to be able to meet subscriber required metrics, such as Quality of Service (QoS) requirements associated with UE devices, as well as allow the wireless service provider to more efficiently manage resources and wireless connections, including handovers between base stations.

Implementations described herein provide systems and methods for detecting UAVs from among other UE devices operating in a wireless network. In an exemplary implementation, a machine learning model may be generated to analyze connection-related data, such as per-call measurement data (PCMD) associated with UE devices operating in the wireless network. In some implementations, the machine learning model may include a machine learning classifier that uses logistic regression to correctly classify UAV related records from non-UAV records. The machine learning classifier may also be updated as additional data is received, including data from known UAVs, to further refine the logistic regression model and enhance accuracy.

In some implementations, the identification of UAVs may be provided to a network management module to aid in providing reliable network services, such as provisioning resources, managing connections with base stations, selecting antenna beams to service UAVs, assigning network slices to UAVs, etc. Such network management may enable the network service provider to meet QoS and/or service level agreement (SLA) metrics for a subscriber associated with a UAV. In this manner, a wireless service provider may provide reliable network services to UAVs and other UEs, while also optimizing use of network resources.

Figure 1:
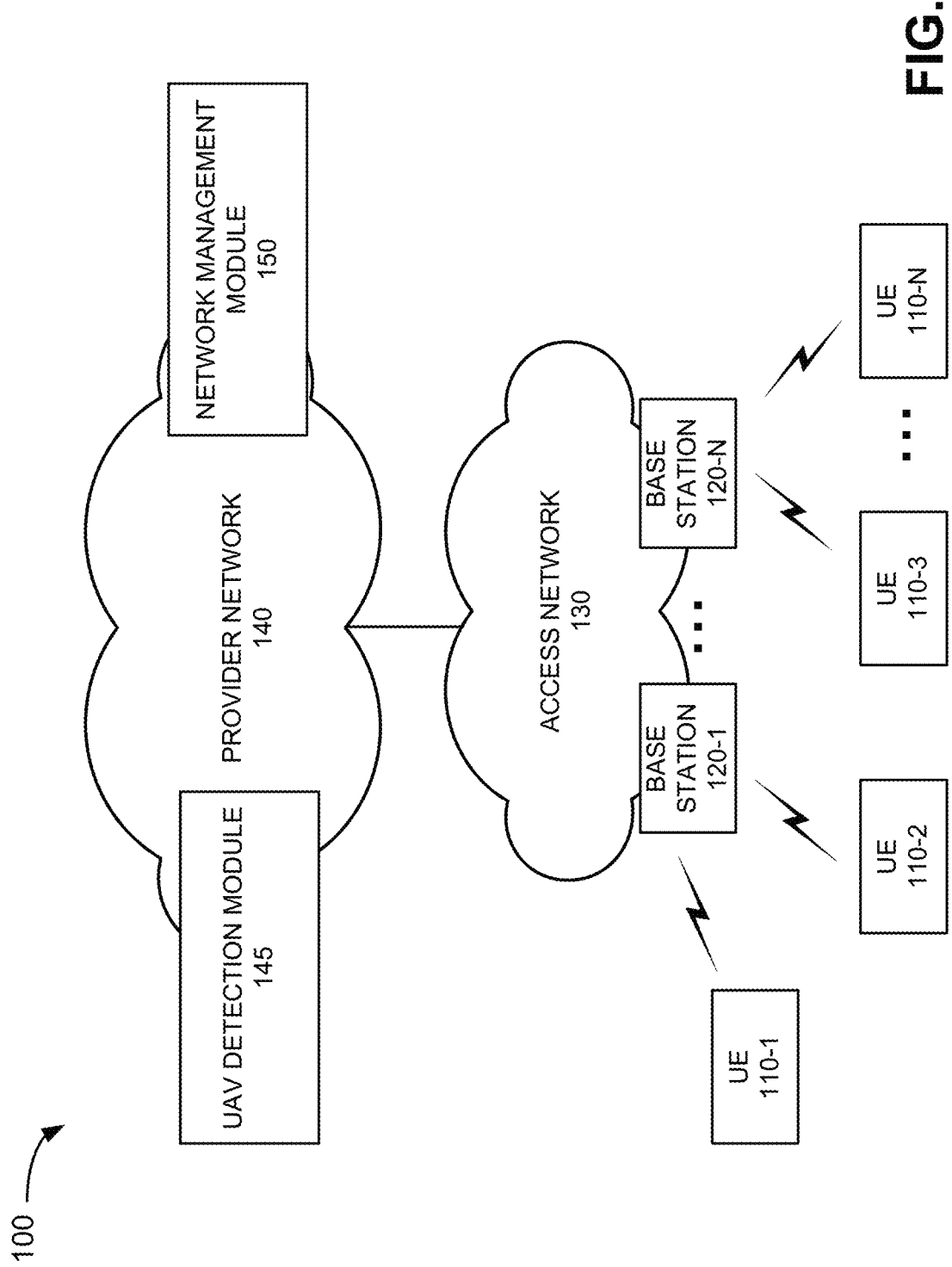
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes UE devices 110-1 to 110-N (referred to collectively as UEs 110 and individually as UE 110), base stations 120-1 to 120-N (referred to collectively as base stations 120 and individually as base station 120), access network 130, provider network 140, UAV detection module 145 and service management module 150.

UEs 110 may include mobile devices, such as wireless or cellular telephone devices (e.g., a conventional cell phone with data processing capabilities), smart phones, personal digital assistants (PDAs) that can include a radiotelephone, any type of mobile or fixed computer device or system, such as a personal computer (PC), a laptop, a tablet computer, a notebook, a netbook, a wearable computer (e.g., a wrist watch, eyeglasses, etc.), game playing devices, music playing devices, etc. UEs 110 may also include machine-type communications (MTC) devices, Internet of Things (IoT) devices, machine-to-machine (M2M) devices, etc., that includes communication functionality, such as a home appliance device, a home monitoring device, a camera, etc.

UEs 110 may further include UAVs that communicate via base stations 120 and access network 130 to/from provider network 140. For example, the UAVs may each include an aircraft (e.g., a single rotor aircraft, multirotor aircraft or fixed wing aircraft) that receives control signals from a controller, such as a user device (not shown) to control the flight of UAV. The UAVs may further include cellular communication capability (e.g., fifth generation (5G) communication capability, fourth generation long term evolution (4G LTE) communication capability, etc.) to allow UAV 110 to receive and transmit data and information (e.g., receive commands from a remotely located control device (not shown) to control the flight, transmit aerial images to a remotely located device, etc.). The UAVs may also include a short range wireless communication capability (e.g., Wi-Fi) to allow the UAVs to receive data from and transmit data to devices and systems located physically proximate to the UAVs.

UE 110 and the person associated with UE 110 (e.g., the party holding, using and/or operating UE 110) may be referred to collectively as UE 110 in the description below. In an exemplary implementation, UE 110 uses wireless channels to communicate with base stations 120. The wireless channels may correspond, for example, to a physical layer in accordance with different radio access technology (RAT) types. For example, wireless channels may correspond to physical layer associated with Fifth Generation (5G) New Radio (NR) standards. In other implementations, the wireless channels may correspond to physical layers associated with Fourth Generation Long Term Evolution (4G LTE), 4.5G or other air interfaces. In an exemplary implementation, UE 110 may be a 5G-capable device that provides voice communication, mobile broadband services (e.g., video streaming, real-time gaming, high speed Internet access etc.), best effort data traffic, and/or other types of applications via a 5G NR service using various frequency bands, including millimeter wave (mmWave) radio frequencies. In other implementations, UE 110 may be a 4G LTE capable device and/or a dual connectivity device capable of communicating in accordance with both 4G LTE and 5G standards.

Base stations 120 may be associated with a communication network, such as a 5G network, a 4G LTE network, etc. Each base station 120 may service a set of UE devices 110 that include UAVs. For example, base stations 120 may be part of a radio access network (RAN) that connects UAVs to provider network 140, to allow UEs 110 to send/receive data.

In one implementation, base station 120 may include a 5G base station (e.g., a next generation NodeB (gNB)) that includes one or more radio frequency (RF) transceivers. For example, base station 120 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams, as described in detail below. In some implementations, base station 120 may also include a 4G base station (e.g., an evolved NodeB (eNodeB)) that communicates wirelessly with UE devices 110 located within the service range of base station 120.

Access network 130 may include a RAN that includes base stations 120. Base stations 120, as described above, may service UEs 110 in environment 100. Access network 130 may provide a connection between UEs 110 and provider network 140.

Provider network 140 may include one or more wired, wireless and/or optical networks that are capable of receiving and transmitting data, voice and/or video signals. For example, provider network 140 may include one or more public switched telephone networks (PSTNs) or other type of switched network. Provider network 140 may further include one or more satellite networks, one or more packet switched networks, such as an Internet protocol (IP) based network, a software defined network (SDN), a local area network (LAN), a Wi-Fi network, a Bluetooth network, a wide area network (WAN), a 5G network, a 4G LTE Advanced network, an intranet, or another type of network that is capable of transmitting data. Provider network 140 may include a core network that provides packet-switched services and wireless Internet protocol (IP) connectivity to various components in environment 100, such as UEs 110, to provide, for example, data, voice, and/or multimedia services.

UAV detection module 145 may include a computer, a processing device, a function and/or logic to identify UAVs within UEs 110. In an exemplary implementation, UAV detection module 145 may use a machine learning classifier that is trained with connection-related data, such as per-call measurement data (PCMD) records that include records associated with known UAVs. UAV detection module 145 may train the machine learning classifier and then use the machine learning classifier to identify UAVs in environment 100, as described in detail below.

Network management module 150 may include a computer, processing device, a function and/or logic to manage operations in environment 100. For example, network management module 150 may receive information from UAV detection module 145 identifying UAVs operating in environment 100. Network management module 150 may use the UAV information to provision and manage resources, manage connections, etc., in environment 100, as described in detail below.

The exemplary configuration illustrated in FIG. 1 is provided for simplicity. It should be understood that a typical environment may include more or fewer devices than illustrated in FIG. 1. For example, environment 100 may include a large number (e.g., hundreds or more) of UEs 110 and base stations 120, as well as multiple UAV detection modules 145 and/or network management modules 150. Environment 100 may also include elements, such as gateways, routers, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
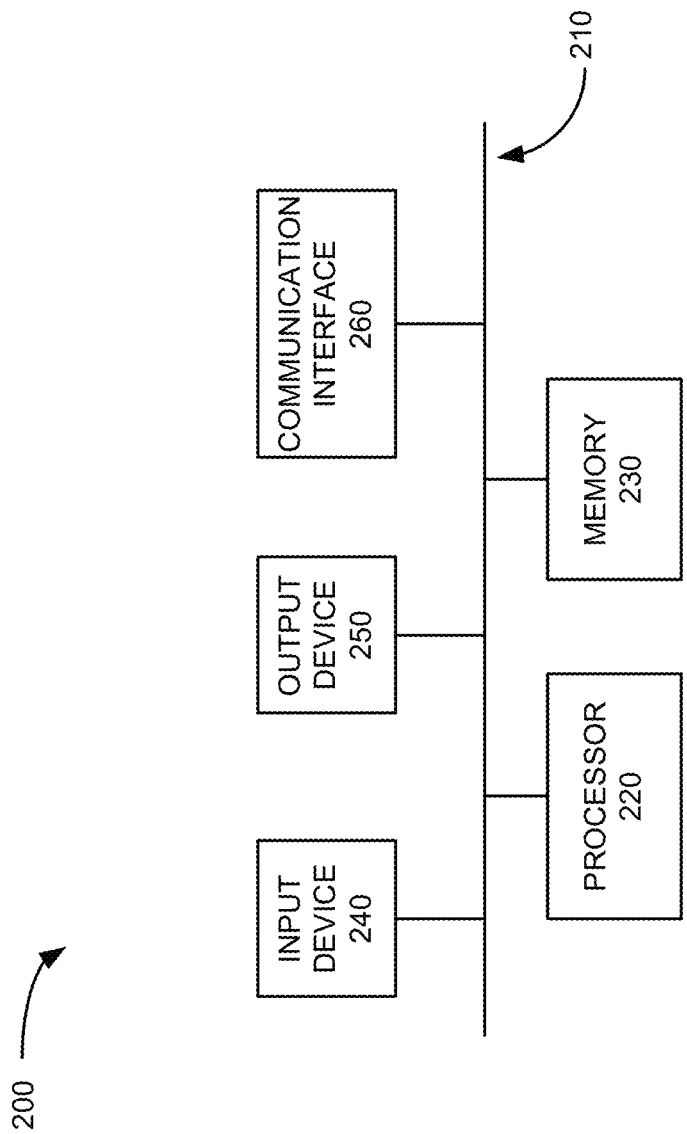
FIG. 2 is a block diagram of components implemented in one or more of the elements described herein in accordance with an exemplary implementation.

FIG. 2 illustrates an exemplary configuration of a device 200. One or more devices 200 may correspond to or be included in UE 110, base station 120, UAV detection module 145, network management module 150 and/or other devices included in environment 100. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network.

The exemplary configuration illustrated in FIG. 2 is provided for simplicity. It should be understood that device 200 may include more or fewer components than illustrated in FIG. 2. For example, for device 200 implemented in UE 110 such as a UAV or a non-UAV device, device 200 may include a positioning system/satellite navigation system, such as a global positioning system (GPS) component, which may provide position information in relation to a standard reference frame (e.g., latitude and longitude information), sensors and control circuitry to, for example, control and/or monitor the flight of the UAV.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), solid state drive (SSD), etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
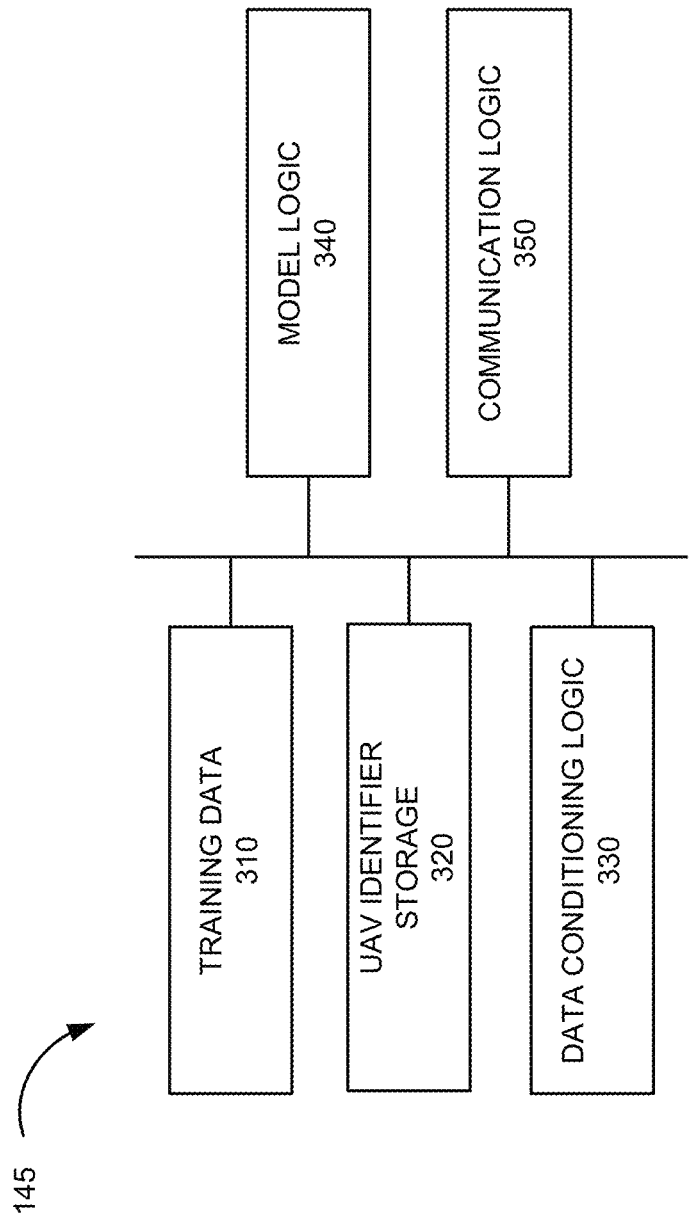
FIG. 3 illustrates exemplary logic components implemented in a UAV detection module in accordance with an exemplary implementation.

FIG. 3 is a functional block diagram of components implemented in UAV detection module 145 in accordance with an exemplary implementation. Referring to FIG. 3, UAV detection module 145 may include training data 310, UAV identifier storage 320, data conditioning logic 330, model logic 340 and communication logic 350. These elements may be implemented by processor 220 executing instructions stored in memory 230 of UAV detection module 145. In alternative implementations, these components or a portion of these components may be located externally with respect to UAV detection module 145.

Training data 310 may include raw (e.g., unfiltered, unformatted, etc.) data received by, for example, base stations 120 when interacting with UEs 110. Training data 310 may also include filtered and formatted data that is processed by data conditioning logic 330, as described in detail below. For example, training data 310 may include per-call measurement data (PCMD) records collected by base stations 120 connected to UEs 110. The PCMD may include channel quality related metrics, such as a Reference Signal Received Power (RSRP) value, a signal-to-noise ratio (SNR) value, a signal-to-interference-plus-noise ratio (SINR) value, a block error rate (BLER) value, a Received Signal Strength Indication (RSSI) value, a Reference Signal Received Quality (RSRQ) value, a UE power headroom value, etc., associated with connections from UEs 110 to base stations 120. The PCMD records may also include distance information to base station 120, such as timing advance (TA) information, as well as other PCMD (e.g., intersite distance, handover attempts, etc.) associated with connections from UE devices 110 to base station 120. The PCMD may be transmitted from UEs 110 to base stations 120 acting as serving base stations to UE devices 110 connected to those base station 120.

UAV identifier storage 320 may include a memory storing information identifying known UAVs operating in environment 100. For example, in accordance with an exemplary implementation, UAV identifier storage 320 may store identifiers, such as International Mobile Subscriber Identity (IMSI) values known to be associated with UAVs operating in environment 100. In this case, UAV identifier storage 320 may be used by data conditioning logic 330 and model logic 340 to generate a training dataset to train a classifier and also allow model logic 340 to determine the accuracy of one or more models used to identify UAVs from other non-UAV UE devices 110, as described in more detail below.

Data conditioning logic 330 may include logic to filter and/or adjust the raw PCMD records stored in training data 310. For example, in a typical environment 100, the percentage of UEs 110 operating in environment that correspond to UAVs is very small (e.g., typically less than 1%). To ensure a more balanced dataset that can be used by model logic 340 to accurately identify UAVs flying in environment 100, training data 310 may be filtered to achieve a more balanced dataset, such as a dataset having more than 10% UAVs.

In one implementation, data conditioning logic 330 may use timing advance (TA) information obtained in PCMD records stored in training data 310 to filter the training data 310. For example, data conditioning logic 330 may identify UAV records based on information stored in UAV identifier storage 320, and then identify all non-UAV records that are more than a predetermined distance away from a known UAV record as measured by, for example, an end_timing_advance_meters field. Data conditioning logic 330 may then remove the non-UAV records associated with UEs 110 located more than the predetermined distance away from a known UAV and/or more than a predetermined distance away from a base station 120 serving a known UAV.

Model logic 340 may include one or more models, such as machine learning models, to identify UAVs from other UEs 110 in environment 100. For example, model logic 340 may include one or more models that use a machine learning classifier trained to classify UAV records and non-UAV records using logistic regression. In an exemplary implementation, model logic 340 may store a machine learning model that is trained on PCMD records stored in training data 310 that are associated with all base stations 120 in environment 100 (referred to herein as an all-world model), a model that is trained on subsets of the training data, such as subsets of training data associated with each base station 120 (referred to herein as a base station level model), a model that is based on a combination of various features of one or more base station level models and the all-world model and applied to all of UEs 110 in environment 100 (referred to herein as a combined model). In each case, model logic 340 may use machine learning classifiers to identify UAVs operating in environment 100, as described in detail below.

Communication logic 350 may include logic for communicating with devices in environment 100. For example, communication logic 350 may transmit data to and receive data from UEs 110, via base stations 120, access network 130 and/or provider network 140. Communication logic 350 may also communicate with other devices in environment 100, such as network management module 150.

Although FIG. 3 shows exemplary components of UAV detection module 145, in other implementations, UAV detection module 145 may include fewer components, different components, differently arranged components, or additional components than depicted in FIG. 3. In addition, in some implementation, various functions described as being performed by UAV detection module 145 may be performed by other devices located externally with respect to UAV detection module 120, such as by base station 120 and/or other devices in access network 130 and/or provider network 140.

Figure 4:
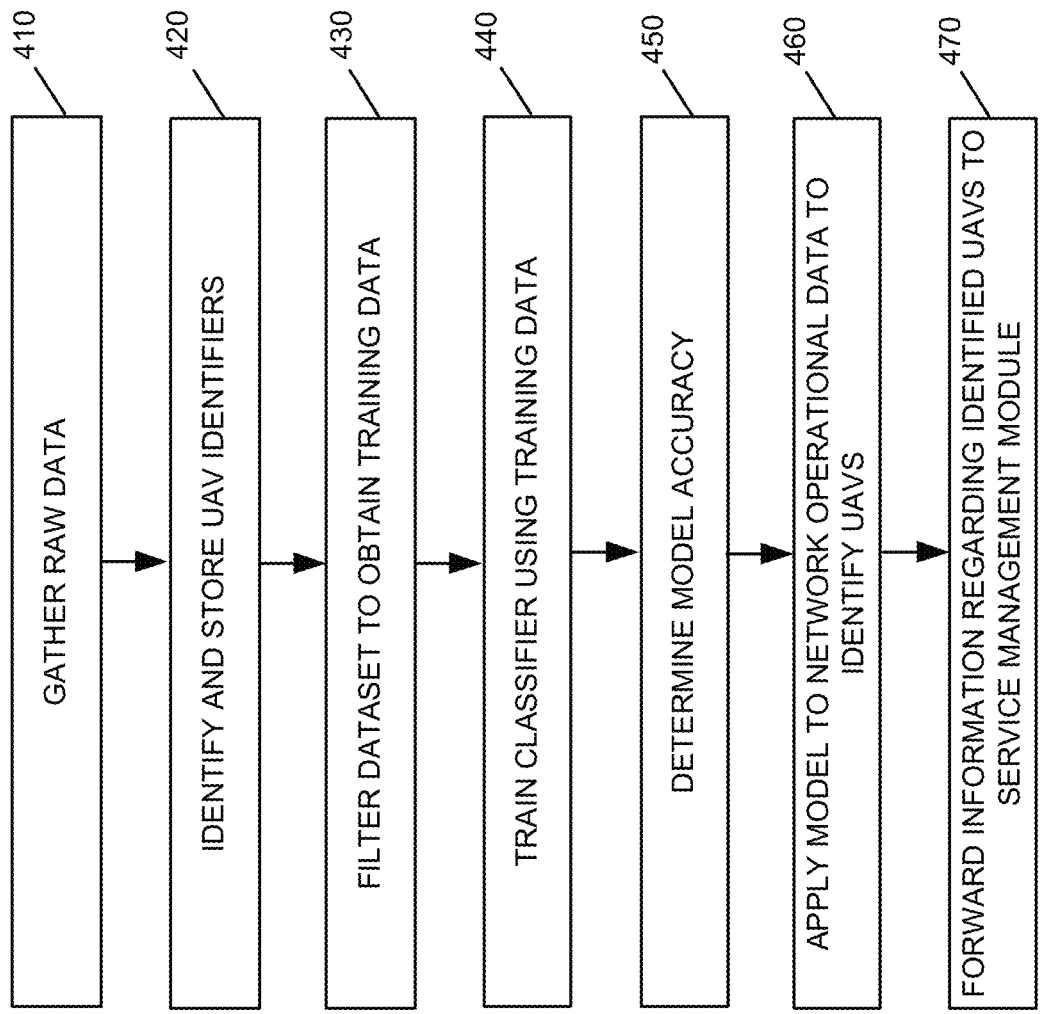
FIG. 4 is a flow diagram illustrating processing associated with identifying UAVs in accordance with an exemplary implementation.

FIG. 4 is a flow diagram illustrating processing associated with identifying UAVs operating in environment 100 in accordance with an exemplary implementation. Processing may begin with gathering raw data associated with connections from UEs 110 to base stations 120 (block 410). For example, as described above, UAV detection module 145 may obtain PCMD records associated with UEs 110 from base stations 120, including RSRP values, SINR values, TA distance information, UE power headroom information, etc. UAV detection module 145 may store the PCMD records in training data 310.

UAV detection module 145 may also store information identifying known UAVs operating in environment 100 and associated with the obtained data (block 420). For example, personnel associated with managing and operating UAVs in environment 100 may provide UAV identifiers, such an International Mobile Equipment Identity (IMEI) values or other identifiers, associated with known UAVs flying in environment 100 to UAV detection module 145. The UAV identifiers may be stored in UAV identifier storage 320. The UAV identifiers may be used to filter the obtained PCMD records and also used at a later time to determine whether the machine learning classifier associated with model logic 340 is able to correctly identify UAVs from non-UAVs, as described in more detail below.

Once the information identifying the known UAVs has been stored, UAV detection module 145 may filter the training data (e.g., the raw PCMD records) to reduce the number of records (block 430). For example, in one implementation, data conditioning logic 330 may filter the PCMD records using distance information, such as timing advance (TA) distance information. In one exemplary implementation, data conditioning logic 330 may identify known UAVs based on the IMEI values stored in UAV identifier storage 320. Data conditioning logic 330 may then identify PCMD records in training data 310 that are associated with UEs 110 located greater than a predetermined distance from a known UAV. For example, data conditioning logic 330 may use the distance as measured by the end_timing_advance_meters field included in the PCMD records stored in training data 310 to identify UE devices 110 that are greater than the predetermined distance from a known UAV. For example, if the end_timing_advance_meters field indicates that a UAV is 2,000 meters from a base station 120 and the end_timing_advance_meters field indicates that a non-UAV UE 110 is 30 kilometers away from the base station 120, data conditioning logic 330 may determine that the non-UAV UE 110 is located greater than the predetermined distance from the UAV and/or greater than a predetermined distance from a service base station 120 associated with the UAV. Data conditioning logic 330 may then remove data associated with UEs 110 located greater than the predetermined distance from a UAV/serving base station 120 from the training data 310. In other implementations in which raw PCMD records includes geographic information, such as GPS information including latitude and longitude information provided by UEs 110, data conditioning logic 330 may identify PCMD records associated with UEs 110 that are located more than a predetermined distance from a known UAV using the GPS information, and then remove such data records from training data 310.

Figure 5A:
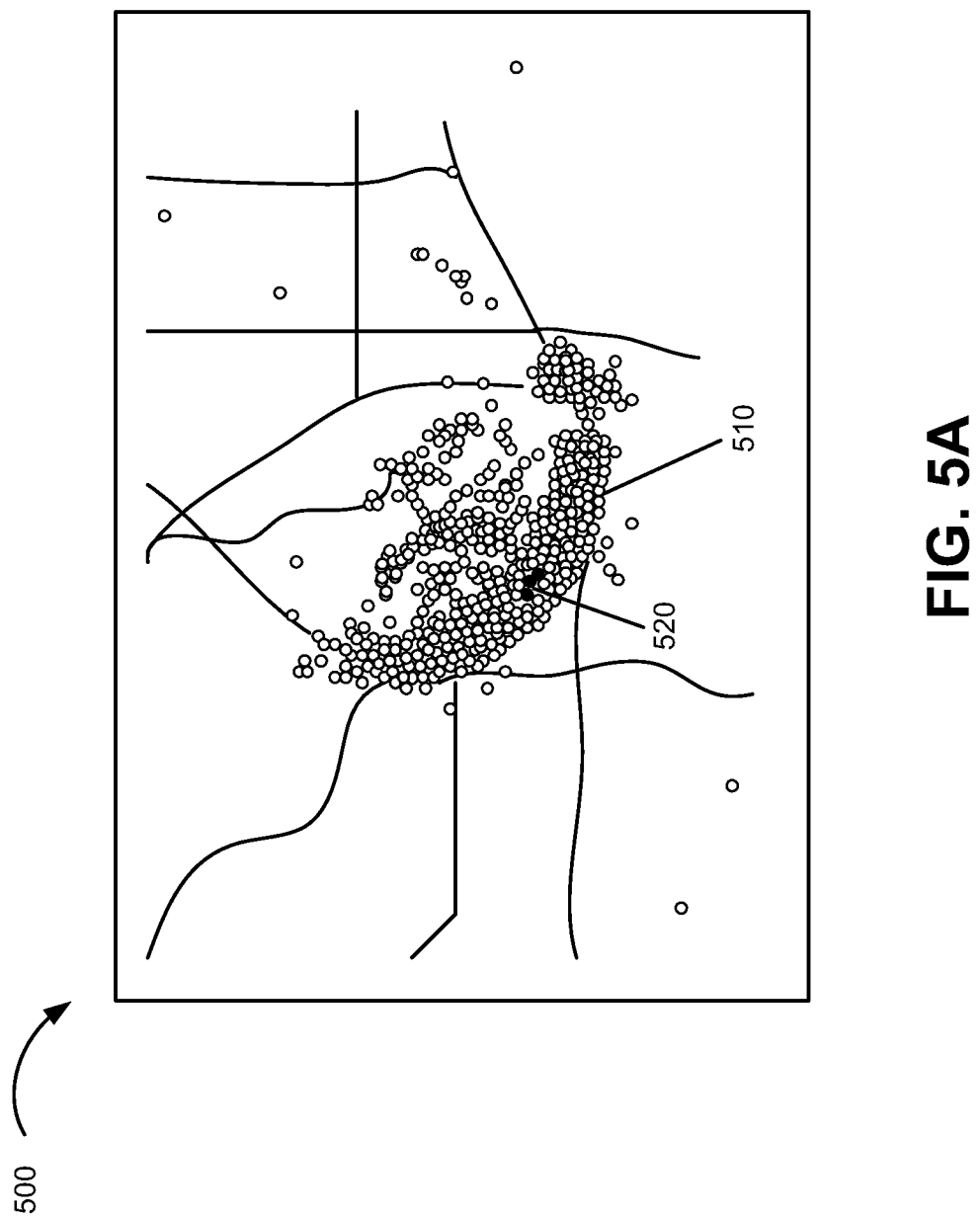
FIGS. 5A and 5B illustrate maps associated with filtered training data in accordance with an exemplary implementation.

In one implementation, filtering PCMD records located greater than a predetermined distance from a known UAV may result in arcs of data centered on a serving base station 120, as illustrated in FIG. 5A. Referring to FIG. 5A, map 500 includes an arc-shaped area of circles 510 representing UEs 110. In this example, the darker circles at area 520 correspond to known UAVs. Based on the distance filtering, the percentage of UAVs in the training data 310 (illustrated in area 510) has increased as compared to the original raw data. The increased number of UAVs in the training data 310 may aid in generating more accurate UAV prediction, as described in detail below.

Figure 5B:
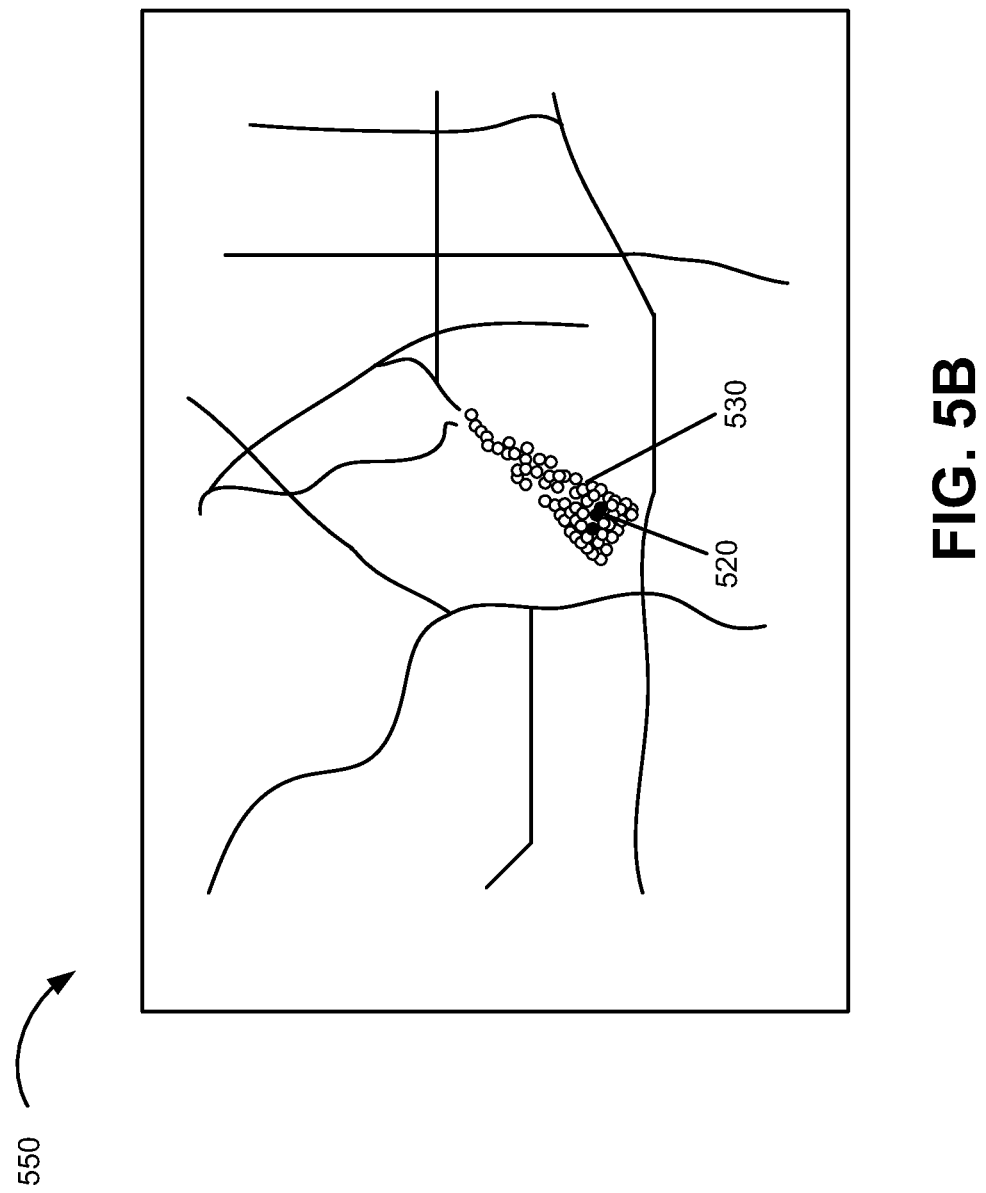

In an exemplary implementation, data conditioning logic 330 may perform additional filtering. For example, data conditioning logic 330 may calculate an azimuth from each serving base station 120 to each individual UE 110. The azimuth from each serving base station 120, such as from the main antenna beam/radiation pattern, to each UE 110 may be set to predetermined minimum and maximum values, plus/minus some value (e.g., 5%). Data conditioning logic 330 may then remove records for UEs 110 that fall outside the areas or sector wedges defined by the minimum and maximum azimuth values. Performing the additional azimuth filtering may result in a smaller dataset represented by map 550 illustrated in FIG. 5B. Referring to FIG. 5B, area 530 includes a wedge-shaped area of circles representing UEs 110 within the predetermined azimuths, with the darker circles at area 520 corresponding to known UAVs. Using the reduced dataset represented by the wedge-shaped area 530 in map 550 may result in a higher percentage of UAVs being used for a training dataset than in the dataset represented by map 500. This reduced dataset with a higher percentage of UAVs may also help provide more accurate UAV prediction, as described in more detail below.

Data conditioning logic 330 may also drop unneeded information from the dataset stored in training data 310. For example, data conditioning logic 330 may drop or delete data records related to the service type or final disposition, geolocation data, device type/call specific data, voice over LTE (VoLTE) data and network aggregations, such as handover attempts, failures, etc. In some implementations, after filtering the data, data conditioning logic 330 may format the remaining PCMD records, such as format categorical values, fill in non-applicable entries, etc., to accommodate the particular machine learning model stored in model logic 340.

After filtering unneeded information and performing formatting, if necessary, data conditioning logic 330 may store the filtered data in training data 310. Model logic 340 may then use the filtered data to train a machine learning classifier to identify UAVs from non-UAVs in environment 100 (block 440). In an exemplary implementation, model logic 340 may include a machine learning classifier that uses logistic regression to identify UAVs. It should be understood that machine learning classifiers using other algorithms may be used.

Model logic 340 may also include multiple machine learning models based on the particular implementation or environment 100. For example, as described above, model logic 340 may include an all-world model that uses data from all UEs 110 in environment 100, regardless of which base stations 120 are acting as serving base stations 120 for UAVs. In another implementation, model logic 340 may include a base station level model which uses training data associated with particular base stations 120 to train the machine learning classifier. In still another implementation, model logic 340 may include a combination model that includes features from the all-world and base station level models to train the machine learning classifier. In each case, model logic 340 may include machine learning classifiers that are trained on datasets stored in training data 310 to identify UAVs from other UE devices 110 operating in environment 100.

In accordance with an exemplary implementation, model logic 340 may divide a filtered dataset stored in training data 310 into training data and test data. For example, model logic 340 may designate 80% of the data as training data and 20% of the data as test data. It should be understood that different percentages for training and test data may be used in other implementations. Model logic 340 may then use the training data to train the machine learning classifier to correctly classify UAV records and non-UAV records.

For example, the training data may be input to a machine learning classifier that uses logistic regression to identify UAVs from non-UAV UEs 110. In one implementation, the training data may be input to the machine learning classifier regardless of which particular base station 120 the data is associated with (referred to above as the all-world model). In another implementation, the training data may be input to the machine learning classifier as subsets of the training data with each subset being associated with particular base stations 120 (referred to above as the base station level model).

In this example, assume that model logic 340 executes the machine learning classifier using the base station level model. For example, model logic 340 may identify the distance-filtered PCMD records that are associated with particular base stations 120 acting as the serving base stations within a predetermined distance of a known UAV, such as UEs 110 represented by map 500 (FIG. 5A). Model logic 340 then train the machine learning classifier using 80% of the subset of data within the predetermined distance of a UAV as training data and the remaining 20% of the subset of data as test data.

Model logic 340 may then execute the machine learning classifier on the 80% of the data designated as training data. After the machine learning classifier is trained, model logic 340 may input the 20% of the data designated as test data to the machine learning classifier to attempt to identify UAVs from non-UAV UEs 110460.

The results generated by model logic 340 identifying particular UAVs may then be compared to the known UAVs using the information stored in UAV identifier storage 320 to determine the accuracy of model logic 340 (block 450). In accordance with one exemplary implementation, model logic 340 using distance-filtered and base-station subsets of data (i.e., the base station level model) performed very well when the percentage of UAV records in the dataset was greater than, for example, about 15% of the total UEs 110. For example, the logistic regression model executed by model logic 340 correctly identified UAVs from non-UAV UEs 110 over 80% of the time when the amount of UAVs in the training dataset was greater than about 15%, and correctly identified UAVs from non-UAV UEs 110 nearly 100% of the time when the amount of UAVs in the training dataset was greater than about 20%.

In another implementation, model logic 340 used the distance-filtered and also azimuth-filtered base station level data described above with respect to FIG. 5B. For example, in this implementation, model logic 340 may use training data filtered by both distance information (e.g., TA advance information), as well as sector-wedge filtered data that used predetermined minimum and maximum azimuth values to filter the training data, such as the UEs 110 represented in wedge-shaped area 520 in map 550 (FIG. 5B). After the machine learning classifier is trained using the 80% of the data identified as training data, model logic 340 may input the 20% of the data designated as test data to the machine learning classifier to attempt to identify UAVs from non-UAV UEs 110. The results generated by model logic 340 identifying particular UAVs may then be compared to the known UAVs using the information stored in UAV identifier storage 320 to determine the accuracy of model logic 340. In this implementation, model logic 340 was found to perform very well when the percentage of UAV records in the dataset was greater than, for example, about 9% of the total UEs 110. For example, model logic 340 using a logistic regression machine learning classifier correctly identified UAVs over 80% of the time when the amount of UAVs in the dataset was greater than about 9% of the total data records, and correctly identified UAVs from non-UAV UEs 110 over 90% of the time when the amount of UAVs in the training dataset was greater than about 12%.

In still another implementation, model generation logic 340 may use a combination of base station level models (e.g., one model using distance filtering, another model using azimuth filtering), etc., to generate a combined all-world model. In this implementation, model logic 340 identified weights for each prediction PCMD feature for each model, such as RSRP, SINR, UE power headroom, etc. For example, the model weights associated with RSPRP, SIRN and UE headroom may be higher than the weights associated with other PCMD records, such a record identifying the number of handover attempts or the number of handover executions. Model logic 340 may then combine the model weights for each PCMD feature and perform logistic regression classifying using the combined model weights. That is, the determined model weights for each PCMD feature were averaged and the resulting weights applied to the entire training dataset. In an exemplary implementation, model logic 340 was able to detect UAVs using the combined model with less accuracy than with the base station level model approaches described above.

Returning to FIG. 4, after model logic 340 has trained the machine learning classifier and determined the level of accuracy with respect to test data, UAV detection module 145 may, for example, apply model logic 340 to network operational data to identify UAVs operating in environment 100 (block 460). For example, UAV detection module 145 may continuously or periodically obtain raw PCMD records associated with UEs 110 via base stations 120 and filter the data as described above. Model logic 340 may then periodically or continuously attempt to identify UAVs operating in environment 100 using the filtered PCMD records. For example, assume that UE 110-2 (FIG. 1) is a UAV that is in flight and further assume that model logic 340 correctly identified UE 110-2 as a UAV. In this case, UAV detection module 145 may forward information identifying UE 110-2 as a UAV to network management module 150 (block 470).

In one implementation, network management module 150 may then make network management and provisioning determinations based on whether a UE 110 is a UAV. For example, network management module 150 may manage connections from base stations 120 to UAVs, assign resources to UAVs and non-UAV UEs 110, prioritize commands, select antenna beams to service UAVs, such as assign a wider antenna beam to a UAV as opposed to a non-UAV UE 110, assign network slices to UAVs, etc. Such network management may enable the network service provider to meet QoS and/or SLA metrics for a subscriber associated with a UAV. In other implementations, network management module 150 may identify UAVs for other reasons. For example, knowing locations of UAVs operating in environment 100 may be used for security-related reasons, such as being able to alert personnel in a secure area that a UAV is flying within or close to the secure area. In this case, network management module 150 may be aware of secure areas and alert the appropriate personnel when a UAV is flying in/near that area.

As described above, UAV detection module 145 may identify UAVs using an all-world model, a base station level model or a combination of all-world and base station level models using PCMD records. In another implementation, UAV detection module 145 may perform additional filtering of the data using, for example, perform filtering based on topology-related or environmental-related fields or features.

As an example, data conditioning logic 330 may include a sector azimuth field to define a number of degrees from a main antenna beam/radiation pattern generated from base station 120 to UEs 110 to further filter the PCMD records stored in training data 310. This additional data filtering field may be used to filter training data to increase the percentage of UAVs in a training dataset. This may also allow model logic 340 to effectively model antenna patterns in the data.

As another example, UAV classification module 145 may add a field to the PCMD records stored in training data 310 to identify whether the serving base station 120 is classified as "urban," "suburban," or "rural." These classifications may be set by the service provider associated with environment 100 and may allow the machine learning classifier in model logic 340 to adjust for elevation differences in UE 110 profiles observed in areas with, for example, multi-story buildings, tall overpasses, etc. As a result, this additional classification may allow model logic 340 to more accurately identify UAVs from non-UAV UEs 110.

As described above, in some implementations, a locally-trained model using training data sets filtered based on distance from a known UAV, based on subsets of data corresponding to particular serving base stations 120 and/or based on azimuth-based filtering from base stations 120 was shown to provide better results than model logic 340 using an all-world model. However, in in some implementations, it may be difficult to obtain representative training data from each base station 120 in environment 100. For example, some base stations 120 may not receive adequate UAV traffic for training the machine learning classifier. As a result, an all-world or global model may be deployed on some sites which can be updated in the event that representative UAV training data is obtained.

Figure 6:
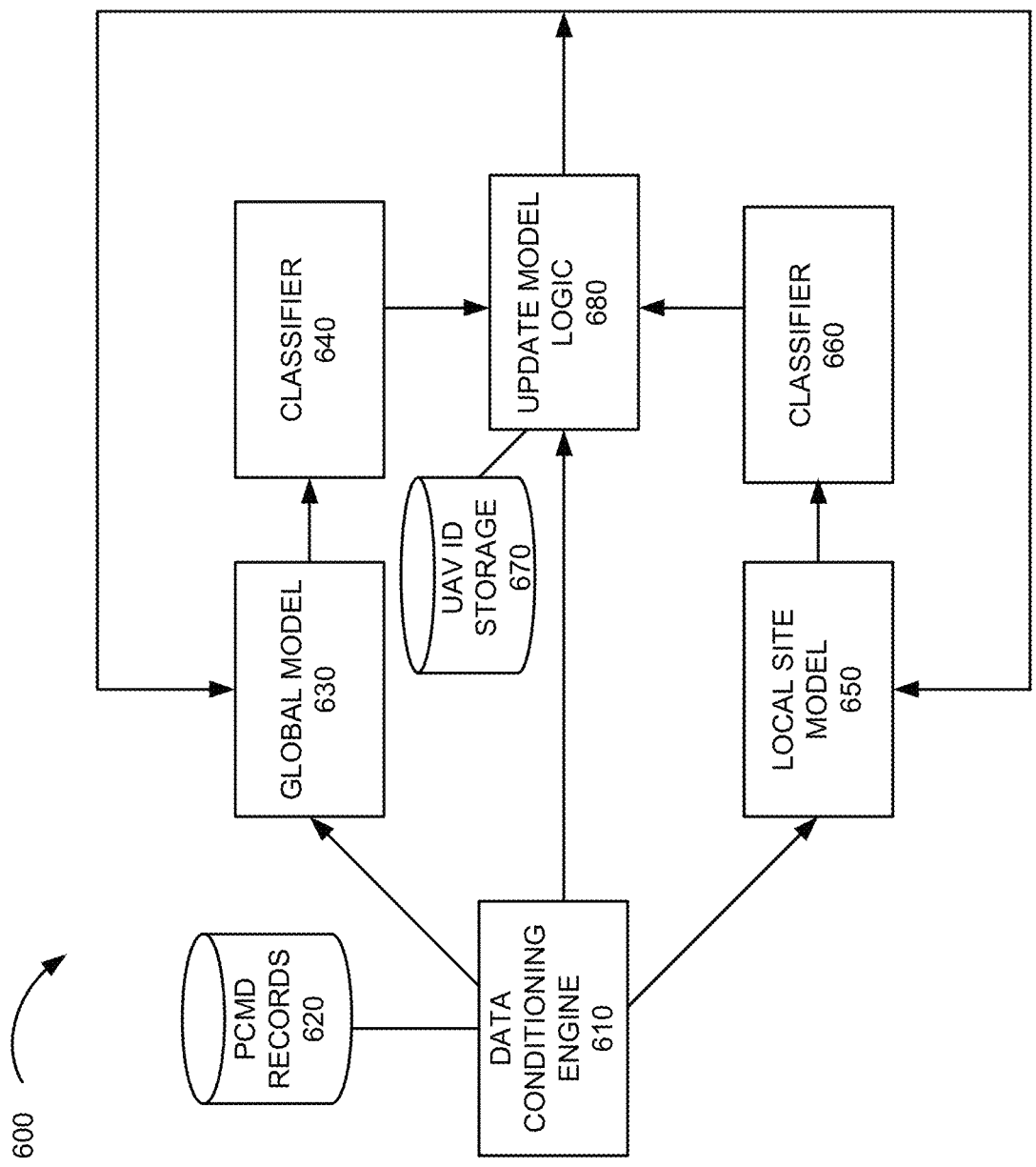
FIG. 6 is a block diagram of components associated with updating local and global machine learning models in accordance with an exemplary implementation.

For example, FIG. 6 illustrates an exemplary global-local model system that is updated over time. Referring to FIG. 6, system 600 includes data conditioning engine 610, PCMD records 620, global model 630, classifier 640, local site model 650, classifier 660, UAV ID storage 670 and update model logic 680. Data conditioning engine 610 may perform data filtering and conditioning similar to data conditioning logic 330 described above. For example, data formatting logic 610 may filter PCMD records 620 based on distance from a known UAV, based on a serving base station 120, based on minimum and maximum azimuth values from a base station 120, etc. In system 600, global model 630 and its corresponding classifier 640 may use PCMD records 620 regardless of the particular base stations, while local site model 650 and its corresponding classifier 660 may use distance, base-station and sector filtering as described above. As new data is received, such as PCMD records associated with known UAVs operating in environment 100, update model logic 680 may provide feedback to both global model 630 and local site model 650. In this manner, both a global/all-world model and base station level model may be updated in a recursive manner and its corresponding classifier updated when additional data, including known UAV-related data, is received. This may allow system 600 to achieve more accurate UAV detection in both the global model 630 and local model 660. That is, over time, both the global model 630 and local model 660 may become more accurate based on the presence of more UAVs in environment 100. This may allow UAV detection module 145 to deploy different models and allow a service provider to provide for accurate UAV detection at all base stations 120.

For example, in some implementations, the service provider associated with environment 100 may apply the all-world model to some base stations 120 that receive a small amount of UAV connections, while applying the base station level model that has been shown to be accurate with respect to base stations 120 that receive more UAV traffic.

Implementations described herein allow a service provider to detect UAVs operating in a wireless network. This may allow a service provider to provide more reliable network management and resource provisioning for all UE devices, including UAVs. For example, the wireless service provider may manage connections with base stations based on the types of UEs connected to the base stations, select particular antenna beams to service UAVs (e.g., a wider antenna beam) versus non-UAV UEs, assigning network slices to UAVs, etc. In addition, implementations described herein also allow a machine learning model to be updated as additional data is received. This may allow the machine learning model to increase its accuracy with respect to identifying UAVs and allow the service provider to optimize use of network resources and provide more reliable wireless services.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, implementations have been described above with respect to UAV detection module 145 being located in provider network 140. In other implementations, UAV detection module 145 may be deployed elsewhere in environment 100, such as at an edge network located close to base stations 120 (e.g., in access network 130 or close to access network 130), at base stations 120, etc. In each case, UAV detection module 145 may be able to receive PCMD records in real time and identify UAVs operating in environment 100 using one of the models described above.

In addition, features have been described above with respect to machine learning models using logistic regression. In other implementations, the machine learning models may use classifiers using other types of algorithms, such as decision trees, convolutional neural network algorithms, anomaly/rare events detection algorithms, etc.

Further, while series of acts have been described with respect to FIG. 4, the order of the acts may be different in other implementations. Moreover, non-dependent acts may be implemented in parallel.

To the extent the aforementioned implementations collect, store or employ personal information of individuals, groups or other entities, it should be understood that such information shall be used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    obtaining connection-related data associated with user equipment (UE) devices operating in a network, wherein the UE devices include unmanned aerial vehicles (UAVs) and devices other than UAVs;
    storing the connection-related data;
    identifying, in the stored connection-related data, data associated with known UAVs;
    filtering the stored connection-related data based on a distance associated with a known UAV, wherein the distance comprises at least one of a distance from the known UAV or a distance from a serving base station serving the known UAV;
    training a machine learning classifier using the filtered data; and
    executing the machine learning classifier to identity UAVs operating in the network.

2. The method of claim 1, wherein the connection-related data comprises per-call measurement data (PCMD) and executing the machine learning classifier comprises using logistic regression to identify UAVs operating in the network.

3. The method of claim 1, wherein the filtering comprises:
    filtering the stored connection-related data to eliminate data associated with UE devices located at least one of more than a predetermined distance from one of a plurality of known UAVs or more than a predetermined distance from a serving base station serving one of the plurality of known UAVs.

4. The method of claim 3, wherein the filtering further comprises:
    determining an azimuth from a base station to each of the UE devices,
    identifying connection-related data corresponding to UE devices that are located outside minimum and maximum azimuth values from the base station, and
    deleting the identified connection-related data corresponding to UE devices that are located outside the minimum and maximum azimuth values from the base station.

5. The method of claim 1, further comprising:
    forwarding information corresponding to the identified UAVs to a service management device; and
    at least one of managing wireless service or connections in the network based on the forwarded information.

6. The method of claim 1, further comprising:
    updating the machine learning classifier using connection-related data associated with known UAVs operating in the network.

7. The method of claim 1, wherein the machine learning classifier is included in a model that uses logistic regression to identify UAVs, the method further comprising:
    testing the model using connection-related data associated with known UAVs.

8. The method of claim 1, wherein the connection-related data comprises at least one of reference signal received power (RSRP) data, signal-to-interference plus noise ratio (SINR), signal-to-noise ratio (SNR) or UE device headroom information.

9. The method of claim 8, further comprising:
    providing at least one of environmental or topology data associated with the connection-related data; and
    using, by the machine learning classifier, the at least on of environmental or topology data to identify UAVs operating in the network.

10. The method of claim 1, wherein the at least one of environmental or topology data comprises data identifying where a base station associated with the connection-related data is an urban area, a suburban area or a rural area.

11. A system, comprising:
    at least one device comprising a processor, wherein the at least one device is configured to:
        obtain connection-related data associated with user equipment (UE) devices operating in a network, wherein the UE devices include unmanned aerial vehicles (UAVs) and devices other than UAVs;
        store the connection-related data;
        identify, in the stored connection-related data, data associated with known UAVs;
        filter the stored connection-related data based on a distance associated with a known UAV, wherein the distance comprises at least one of a distance from the known UAV or a distance from a serving base station serving the known UAV;
        train a machine learning classifier using the filtered data; and
        execute the machine learning classifier to identity UAVs operating in the network.

12. The system of claim 11, wherein the connection-related data comprises per-call measurement data (PCMD) and when executing the machine learning classifier, the at least one device is configured to execute a logistic regression model to identify UAVs operating in the network.

13. The system of claim 11, wherein when filtering, the at least one device is configured to:

filter the stored connection-related data to eliminate data associated with UE devices located at least one of more than a predetermined distance from one of a plurality of known UAVs or more than a predetermined distance from a serving base station with a known UAV serving one of the plurality of known UAVs.

14. The system of claim 13, wherein when filtering, the at least one device is further configured to:
determine an azimuth from a base station to each of the UE devices,
identify connection-related data corresponding to UE devices that are located outside minimum and maximum azimuth values from the base station, and
delete the identified connection-related data corresponding to UE devices that are located outside the minimum and maximum azimuth values from the base station.

15. The system of claim 11, wherein the at least one device is further configured to:
forward information corresponding to the identified UAVs to a service management device; and
at least one of manage wireless service or connections in the network based on the forwarded information.

16. The system of claim 11, wherein the at least one device is further configured to:
update the machine learning classifier using connection-related data associated with known UAVs.

17. The system of claim 11, wherein the connection-related data comprises at least one of reference signal received power (RSRP) data, signal-to-interference plus noise ratio (SINR), signal-to-noise ratio (SNR) or UE device headroom information.

18. The system of claim 11, wherein the at least one device is further configured to:

provide at least one of environmental or topology data with the connection-related data; and
train the machine learning classifier using the at least on of environmental or topology data to identify UAVs operating in the network.

19. A non-transitory computer-readable medium having stored thereon sequences of instructions which, when executed by at least one processor, cause the at least one processor to:
access stored connection-related data associated with user equipment (UE) devices operating in a network, wherein the UE devices include unmanned aerial vehicles (UAVs) and devices other than UAVs;
identify, in the stored connection-related data, data associated with known UAVs;
filter the stored connection-related data based on a distance associated with a known UAV, wherein the distance comprises at least one of a distance from the known UAV or a distance from a serving base station serving the known UAV;
train a machine learning classifier using the filtered data; and
execute the machine learning classifier to identity UAVs operating in the network.

20. The non-transitory computer-readable medium of claim 19, wherein the connection-related data comprises per-call measurement data (PCMD) and when executing the machine learning classifier, the instructions cause the at least one processor to:
execute a logistic regression model to identify UAVs operating in the network.

* * * * *